United States Patent
Soyama

(10) Patent No.: US 7,234,383 B2
(45) Date of Patent: Jun. 26, 2007

(54) CHIP HOLDER

(75) Inventor: Hiroshi Soyama, Nagano (JP)

(73) Assignee: Mitsuboshi Diamond Industrial Co., Ltd., Suita (JP)

( * ) Notice: Subject to any disclaimer, the term of this patent is extended or adjusted under 35 U.S.C. 154(b) by 1 day.

(21) Appl. No.: 10/433,708

(22) PCT Filed: Dec. 5, 2001

(86) PCT No.: PCT/JP01/10656

§ 371 (c)(1),
(2), (4) Date: Jun. 4, 2003

(87) PCT Pub. No.: WO02/45929

PCT Pub. Date: Jun. 13, 2002

(65) Prior Publication Data

US 2005/0098014 A1 May 12, 2005

(30) Foreign Application Priority Data

Dec. 5, 2000 (JP) .............................. 2000-369988

(51) Int. Cl.
*B31B 1/25* (2006.01)
*B26D 1/12* (2006.01)

(52) U.S. Cl. .................. 83/884; 83/886; 83/665

(58) Field of Classification Search ............... 83/884, 83/886, 698.41, 665; 125/13.01, 23.02, 15; 451/541, 548; 30/164.95, 102; 33/27.031, 33/32.3
See application file for complete search history.

(56) References Cited

U.S. PATENT DOCUMENTS

| | | | | | |
|---|---|---|---|---|---|
| 91,150 | A | * | 6/1869 | Monce | ..................... 30/164.95 |
| 1,646,918 | A | * | 10/1927 | Lenston | ........................ 83/886 |
| 2,210,193 | A | * | 8/1940 | Aillaud | ..................... 30/164.95 |
| 2,254,162 | A | * | 8/1941 | Wyman | .................... 30/164.95 |
| 2,265,955 | A | * | 12/1941 | Roberts et al. | ........... 30/164.95 |
| 2,312,635 | A | * | 3/1943 | Fletcher | .................... 30/164.95 |
| 2,707,849 | A | * | 5/1955 | De Vore | ................... 30/164.95 |
| 3,160,043 | A | * | 12/1964 | Judd, Jr. | ................... 30/164.95 |
| 3,387,480 | A | * | 6/1968 | Eaker et al. | ................... 83/886 |

(Continued)

FOREIGN PATENT DOCUMENTS

EP 1340605 A1 * 9/2003

(Continued)

OTHER PUBLICATIONS

Korean Search Report for corresponding Application No. 519980662758 dated Apr. 8, 2005.

(Continued)

*Primary Examiner*—Jason Prone
(74) *Attorney, Agent, or Firm*—Renner, Otto, Boisselle & Sklar, LLP

(57) ABSTRACT

A rotating shaft (23) is inserted through an axial center of a cutter wheel tip for scribing a brittle object. The rotating shaft (23) is integrally provided with the cutter wheel tip. The rotating shaft (23) is inserted into supporting holes (14) provided in side walls (11) of a tip holder (11) so as to be supported. A groove (13) is formed in an upper portion of each supporting hole (14) along an axial direction of the supporting hole (14).

12 Claims, 12 Drawing Sheets

U.S. PATENT DOCUMENTS

| | | | | |
|---|---|---|---|---|
| 3,777,607 | A | * | 12/1973 | Schofield ................. 83/698.41 |
| 3,897,772 | A | * | 8/1975 | Averbuch ................. 125/30.01 |
| 3,903,992 | A | * | 9/1975 | Chivukula et al. .......... 384/373 |
| 4,083,274 | A | * | 4/1978 | Insolio et al. ................. 83/886 |
| 4,098,156 | A | * | 7/1978 | Insolio ........................ 83/886 |
| 4,201,104 | A | * | 5/1980 | Insolio ........................ 83/886 |
| 4,323,050 | A | | 4/1982 | Averbuch |
| 4,672,874 | A | * | 6/1987 | Gach ........................... 83/886 |
| 4,711,981 | A | * | 12/1987 | Aso et al. ................. 219/69.12 |
| 5,331,877 | A | * | 7/1994 | Ishii ............................ 83/886 |
| 5,560,274 | A | * | 10/1996 | Turner ......................... 83/886 |
| 6,065,215 | A | * | 5/2000 | Arai ............................ 30/319 |
| 6,402,004 | B1 | | 6/2002 | Yoshikuni et al. |

FOREIGN PATENT DOCUMENTS

| | | | | |
|---|---|---|---|---|
| JP | U 4-4028 | * | 1/1992 | |
| JP | 07-156133 | | 6/1995 | |
| JP | 7-328852 | * | 12/1995 | |
| JP | 3099022 | * | 8/2000 | |
| JP | 2000-247667 | | 12/2000 | |
| JP | 2001246616 | * | 9/2001 | |
| JP | 2002234748 | * | 8/2002 | |
| KP | 2000-0023191 | | 4/2000 | |

OTHER PUBLICATIONS

Supplementary Partial European Search Report corresponding to European Application No. 01999467.2 dated Apr. 19, 2006.

* cited by examiner

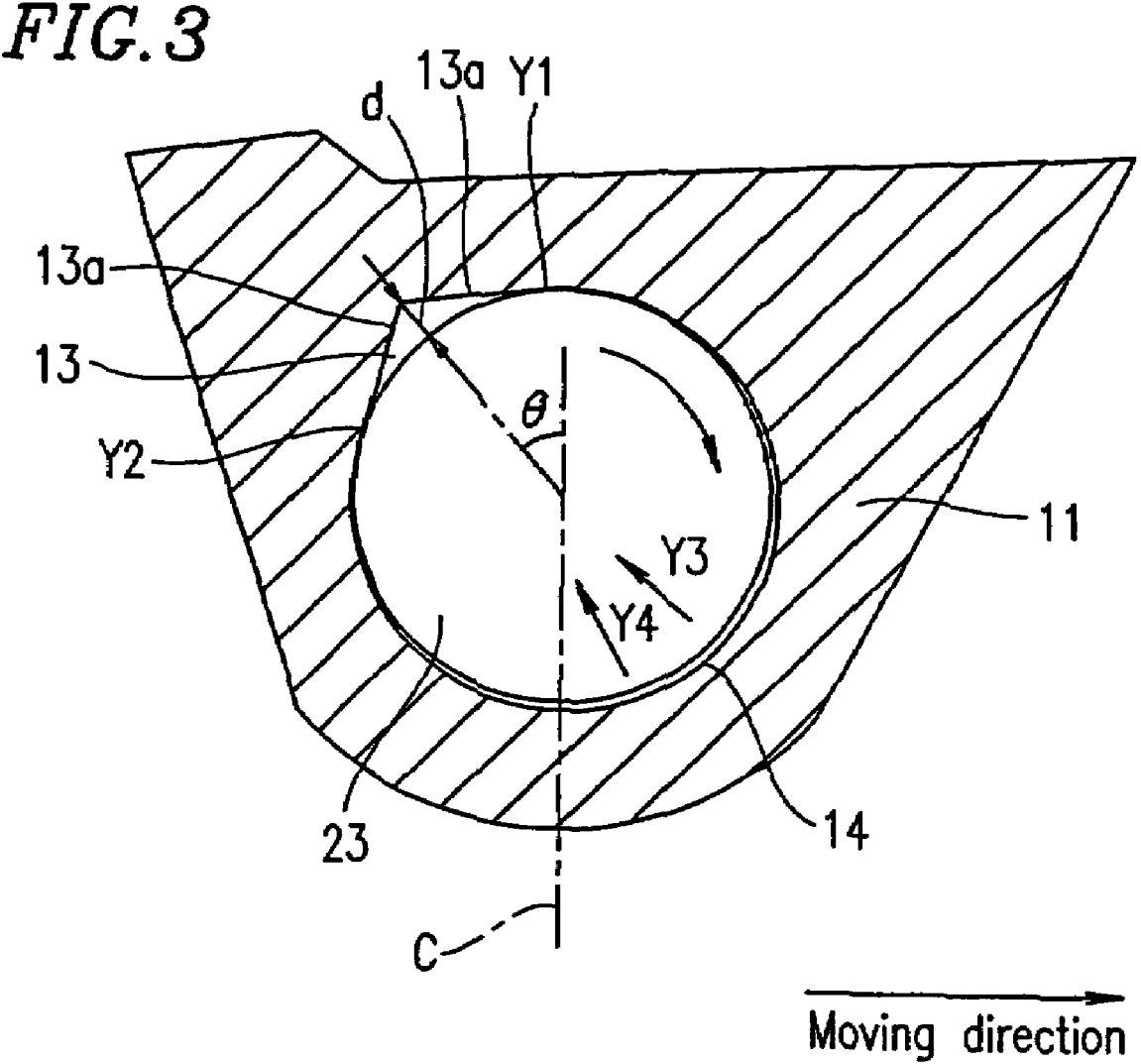

Moving direction

Moving direction

Moving direction

Moving direction

Moving direction

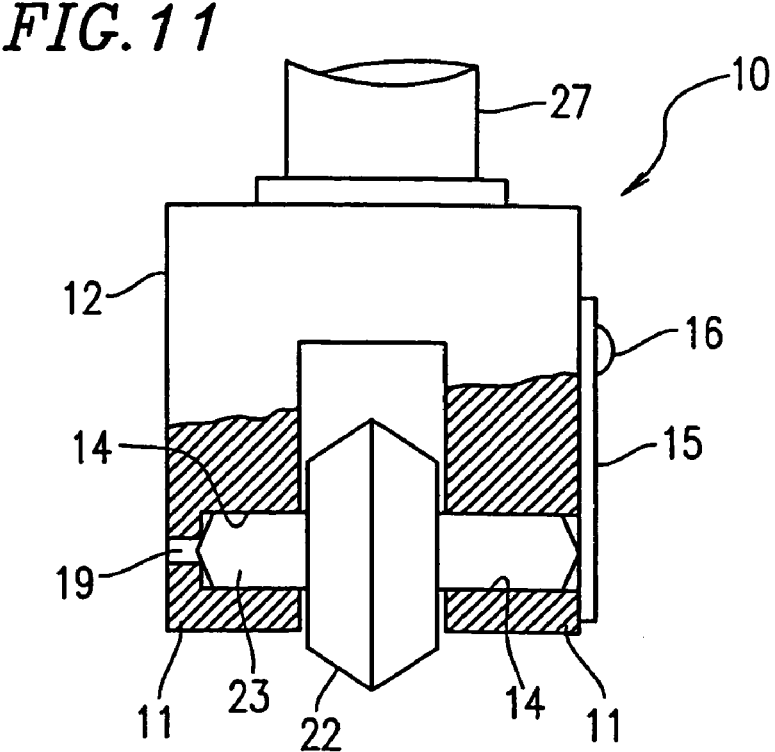
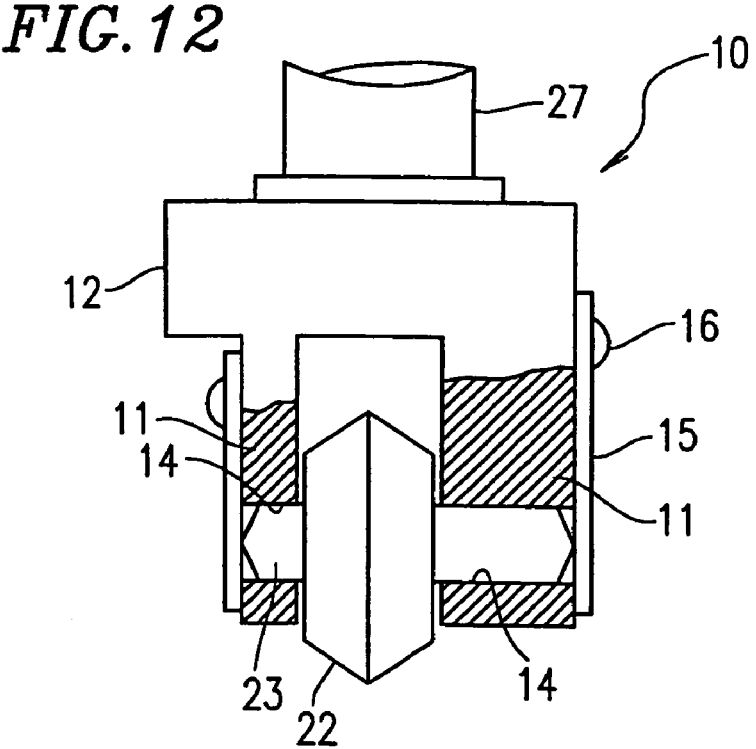

Moving direction

FIG.17

| α (degrees) | f (×P) |
|---|---|
| 10 | 0.087 |
| 15 | 0.129 |
| 20 | 0.171 |
| 25 | 0.211 |
| 30 | 0.250 |
| 35 | 0.287 |
| 40 | 0.321 |
| 45 | 0.354 |
| 50 | 0.383 |
| 60 | 0.433 |
| 70 | 0.470 |
| 80 | 0.492 |
| 90 | 0.500 |

CHIP HOLDER

TECHNICAL FIELD OF THE INVENTION

The present invention relates to a tip holder for holding a cutter wheel tip in a wheel cutter used, for example, for scribing or scoring brittle materials such as, glass, for example.

BACKGROUND OF THE INVENTION

A glass plate used for a liquid crystal display panel or the like is usually produced by first scribing a large mother glass plate with a wheel cutter so as to form scribe lines, and then cutting the mother glass plate along the scribe lines into pieces of a prescribed size. The wheel cutter includes a circular cutter wheel tip held by a tip holder.

The cutter wheel tip is circular, has an outer circumferential surface, and is formed of a hard metal, sintered diamond or the like. A center of the entire outer circumferential surface projects in such a manner so as to be sharp and acts as a blade edge.

The cutter wheel tip has a hole at an axial center thereof, and a rotating shaft is passed through the hole. The hole has a diameter which is slightly larger than the diameter of the rotating shaft, such that the cutter wheel tip is freely rotatable with respect to the rotating shaft.

Each of two side portions of the rotating shaft are respectively supported by a pair of walls included in the tip holder. The cutter wheel tip is located between the walls. The two side portions of the rotating shaft are inserted into supporting holes of the walls.

FIG. 16 is a cross-sectional view of such a rotating shaft 33 which is supported by the walls. As shown in FIG. 16, each of two side portions (only one is shown) of the rotating shaft 33 is inserted into a supporting hole 34 formed in a wall 31 to be supported. The inner diameter of the supporting hole 34 is slightly larger than the outer diameter of the rotating shaft 33, so that there is a slight tolerance G between an inner circumferential surface of the supporting hole 34 and an outer circumferential surface of the rotating shaft 33.

For scribing a brittle object such as a glass plate or the like, the wheel cutter is moved with respect to the brittle object in a prescribed scribing direction. The cutter wheel tip runs on a surface of the brittle object so as to be pressed thereon. In this state, the wheel cutter keeps on moving on the surface in the prescribed scribing direction.

When the cutter wheel tip runs on the brittle object, a force is applied on the cutter wheel tip and also on the rotating shaft 33 engaged with the cutter wheel tip. When the cutter wheel tip is pressed on the brittle object, the rotating shaft 33 is elevated and pressed on an upper portion of the inner circumferential surface of the supporting hole 34.

The rotating shaft 33 contacts the upper portion of the inner circumferential surface of the supporting hole 34 at one contact line Y. In this state, the entire reaction force from the inner circumferential surface of the supporting hole 34 is applied on the rotating shaft 33 at contact line Y. When impact is applied on the cutter wheel tip, the impact is also applied on the rotating shaft 33 engaged with the cutter wheel tip. Then, a reaction force from the entire inner circumferential surface of the supporting hole 34 is applied on the rotating shaft 33 at contact line Y. As a result, the rotating shaft 33 can be undesirably broken at contact line Y.

When the cutter wheel tip pressed on the surface of the brittle object moves on the surface, a frictional force is applied on the rotating shaft 33 due to a reaction force applied on the rotating shaft 33 from the inner circumferential surface of the supporting hole 34, thus restricting the rotation of the rotating shaft 33. The cutter wheel tip rotates with respect to the rotating shaft 33, and thus the edge of the cutter wheel tip, rotatably engaged with the rotating shaft 34, moves while rotating in contact with the surface of the brittle object. Thus, the surface of the brittle object is scribed.

The conventional cutter wheel having the above-described structure has the following problems. The rotating shaft 33 has substantially the same outer diameter as the inner diameter of the supporting hole 34. Therefore, it is possible that the reaction force applied on the rotating shaft 33 from the inner circumferential surface of the supporting hole 34 is too low to stop the rotation of the rotating shaft 33 with certainty, resulting in the rotating shaft 33 slipping and thus further rotating undesirably. Especially when the pressure contact force between the supporting hole 34 and the rotating shaft 33 changes due to a change in the pressing force of the cutter wheel tip on the surface of the brittle object which occurs during the scribing operation, or due to a change in the scribing speed of the cutter wheel tip, the possibility of the rotating shaft 33 slipping so as to rotate on the brittle object surface increases.

When the rotating shaft 33 slips and rotates, the resistance caused by friction between an outer circumferential surface of the rotating shaft 33 and an inner circumferential surface of the cutter wheel tip having a slightly larger diameter than the diameter of the rotating shaft 33 becomes unstable. This may undesirably result in the quality of the scribe lines being non-uniform.

Since the rotating shaft 33 slips, the outer circumferential surface of the rotating shaft 33 and the inner circumferential surface of the supporting hole 34 are abraded, which may undesirably prevent long and stable use of the wheel cutter.

When the rotating shaft 33 slips, a force is applied on the rotating shaft 33 from the inner circumferential surface of the supporting hole 34 in an abnormal direction, which may undesirably damage the rotating shaft 33.

The present invention, for solving the above-described problems, has an objective of providing a tip holder for realizing long and stable use of a rotating shaft engaged with a cutter wheel tip.

Another objective of the present invention is to provide a tip holder for allowing the cutter wheel tip to stably scribe a surface of a brittle object.

BRIEF SUMMARY OF THE INVENTION

A tip holder according to the present invention, for holding a rotating shaft which is inserted through an axial center of a cutter wheel tip for scribing a brittle object, includes supporting holes into which side portions of the rotating shaft are respectively inserted; and grooves respectively provided along the supporting holes.

In one embodiment of the invention, the grooves have a V-shaped or quadrangular cross-section.

In one embodiment of the invention, the supporting holes have a circular or elliptical cross-section.

In one embodiment of the invention, the supporting holes have a polygonal cross-section, and the grooves are defined by one of the corners of the polygon.

In one embodiment of the invention, the grooves are provided on a side opposite to a direction in which the cutter wheel tip moves for scribing, the grooves being at an angle of 0 to 60 degrees with respect to a vertical line passing through the center of across-section of the supporting holes.

In one embodiment of the invention, the supporting holes for supporting the side portions of the rotating shaft have an equal length in an axial direction thereof.

In one embodiment of the invention, the supporting holes for supporting the side portions of the rotating shaft have different lengths in an axial direction thereof.

In one embodiment of the invention, the supporting holes are respectively provided in side walls which are located so as to interpose the cutter wheel tip therebetween, and the tip holder further comprises a tip receiver for preventing the cutter wheel tip from abrading due to contact with the side walls, the tip receiver being provided on a face of each side wall facing the cutter wheel tip.

In one embodiment of the invention, the tip receivers are ring-shaped so as to surround the respective supporting holes.

In one embodiment of the invention, the tip receivers each have a groove on a face thereof facing the cutter wheel tip.

In one embodiment of the invention, the tip receivers are provided in the side walls, and the supporting holds are formed in the tip receivers.

BRIEF DESCRIPTION OF THE DRAWINGS

FIG. 3 is a partial cross-sectional view of the tip holder.

FIG. 11 is a partially cut front view illustrating still another example of a tip holder according to the present invention.

FIG. 12 is a partially cut front view illustrating still another example of a tip holder according to the present invention.

FIG. 17 shows a table representing the ratio of the force f applied on each of borders Y1 and Y2 with respect to the force P applied on the rotating shaft when angle α is changed in expression (1).

DETAILED DESCRIPTION OF THE INVENTION

Hereinafter, the present invention will be described by way of illustrative examples with reference to the accompanying drawings.

Figure 1:
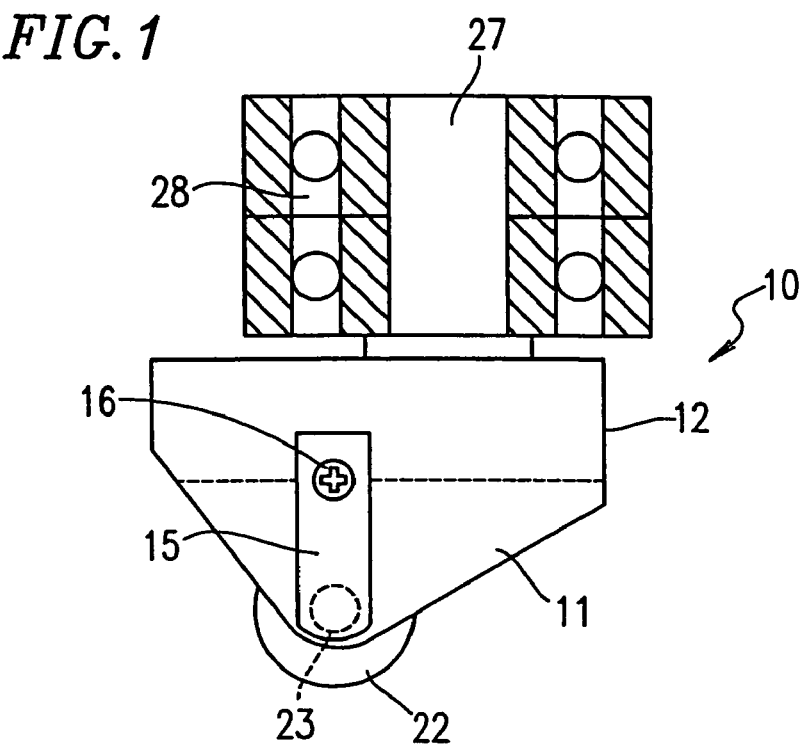
FIG. 1 is a partially cut side view of one example of a wheel cutter including a tip holder according to the present invention.
Figure 2:
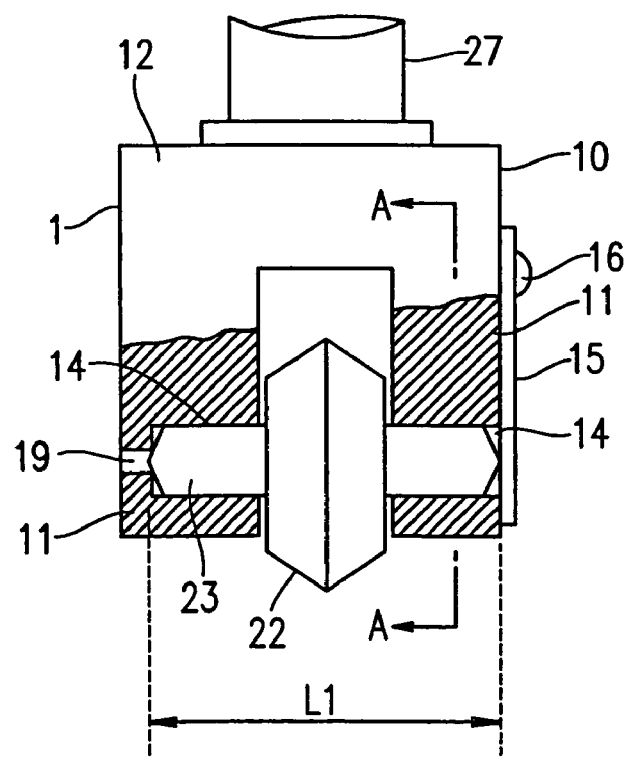
FIG. 2 is a partially cut front view illustrating an example of the tip holder provided in the wheel cutter.

FIG. 1 is a partially cut side view of a wheel cutter 1 including a tip holder 10 according to one example of the present invention, and FIG. 2 is a partially cut front view of the wheel cutter 1. The wheel cutter 1 includes a cutter wheel tip 22 used for scribing a brittle object such as, for example, a glass plate, and the tip holder 10 for holding the cutter wheel tip 22.

The cutter wheel tip 22 is circular, has an outer circumferential surface, and is formed of a hard metal, sintered diamond or the like. A center of the entire outer circumferential surface is projecting in such a manner so as to have an obtuse angle and acts as a blade edge.

The cutter wheel tip 22 has a hole at an axial center thereof, and a rotating shaft 23 is passed through the hole. The hole has a diameter which is slightly larger than the diameter of the rotating shaft 23, such that the cutter wheel tip 22 is freely rotatable with respect to the rotating shaft 23. The rotating shaft 23 projects from the cutter wheel tip 22 in two opposite directions by an equal length.

Each of two ends of the rotating shaft 23 has a cone-like shape having a diameter which gradually reduces toward a tip thereof. Each tip is located on the axis of the rotating shaft 23.

The tip holder 10 for holding the cutter wheel tip 22 includes a top portion 12 which is provided below a supporting shaft 27 and a pair of side walls 11 (only one is shown in FIG. 1) extending from and perpendicularly to the top portion 12. The side walls 11 are separated from each other by an appropriate distance. The side walls 11 each have a uniform thickness, and one of the side walls 11 is thicker than the other. Each side wall 11 has a triangular shape having a gradually reduced width toward a bottom thereof as shown in FIG. 1.

The supporting shaft 27 is rotatable about a vertical axis thereof by a bearing 28, and is loaded downward (toward the tip holder 10) by an appropriate loading member.

The cutter wheel tip 22 is located between the side walls 11 of the tip holder 10.

Each side wall 11 has a horizontal supporting hole 14 for supporting the rotating shaft 23 inserted through the center of the cutter wheel tip 22. Each projecting side portion of the rotating shaft 23 is inserted into the corresponding supporting hole 14. The supporting holes 14 of the side walls 11 are concentric and have an equal diameter. The diameter of each supporting hole 14 is slightly larger than that of the rotating shaft 23 such that the rotating shaft 23 is rotatable. The supporting holes 14 have an equal length in an axial direction thereof.

In the state where the side portions of the rotating shaft 23 are inserted into the supporting holes 14, the cutter wheel tip 22 projects downward from a bottom surface of the side walls 11 by a prescribed distance.

One of the side walls 11 has a pin hole 19 in communication with the supporting hole 14 at an opposite end of the supporting hole 14 from the cutter wheel tip 22. The pin hole 19 has a smaller diameter than that of the supporting hole 14, and is concentric with the supporting hole 14. The tip of one of the cone-like ends of the rotating shaft 23 is concentrically inserted into the pin hole 19 and is supported so as to be rotatable.

The other supporting hole 14 passes through the side wall 11 up to an outer surface of the side wall 11. The outer surface of the side wall 11 has an opening in communication with the supporting hole 14. The tip of the cone-like end of the rotating shaft 23 is located in the opening. A closing plate 15 for closing the opening is provided on the outer surface of the side wall 11. The closing plate 15 is attached to the side wall 11 with a screw 16 provided on a top portion of the closing plate 15. A bottom portion of the closing plate 15 closes the opening, and contacts the tip of the rotating shaft 23 so as to prevent the rotating shaft 23 from coming out of the supporting hole 14.

As described above, the supporting holes 14 in the side walls 11 have an equal length, and one of the side walls 11 has the pin hole 19. Therefore, the side wall 11 having the pin hole 19 is thicker than the other side wall 11 as previously defined.

The top portion 12 is attached to the supporting shaft 27 so that the axis of the supporting shaft 27 is appropriately offset from a vertical line passing through the center of the cutter wheel tip 22, the center being in the axial direction. Therefore, the cutter wheel tip 22 can rotate about the axis of the supporting shaft 27.

For replacing the cutter wheel tip 22 with a new one, the tip holder 10 is handled as follows. The closing plate 15 is pivoted about the screw 16 so as to expose the opening in the side wall 11. Then, a pin is inserted through the pin hole 19 from the outside of the tip holder 10 so that the rotating shaft 23 in the supporting hole 14, in communication with the pin hole 19, is pressed by the pin. Thus, the rotating shaft 23 slides in the supporting holes 14 in the axial direction thereof. In this manner, the rotating shaft 23 comes off from the cutter wheel tip 22 and then comes outside the side wall 11 through the opening.

After the cutter wheel tip 22 is replaced with a new one, the rotating shaft 23 is inserted into the supporting hole 14 from the opening of one side wall 11 and into the new cutter wheel tip 22.

FIG. 3 is a cross-sectional view of FIG. 2 taken along lines A—A in FIG. 2. The following description relates to one side of the tip holder 10 unless otherwise specified. The side wall 11 has a groove 13 above and continuous from the supporting hole 14 in the axial direction of the supporting hole 14. The groove 13 has a V-shaped cross-section and projects outward from the supporting hole 14. The groove 13 is provided on a side opposite to the direction in which the wheel cutter 1 is moved on the surface of the brittle object such as, for example, a glass plate.

The groove 13 is defined by a pair of inner faces 13a lying along a tangent of an inner circumferential surface of the supporting hole 14. An angle made by the inner faces 13a is set so that the groove 13 has a prescribed depth. The angle is set to, for example, 120 degrees.

The groove 13 is provided so that a bisector of the angle made by the inner faces 13a matches a line which makes a prescribed angle θ with a vertical line C passing through the center of the supporting hole 14. The angle θ is set to an angle in the range of 0 to 60 degrees, for example, 30 degrees.

In this example, the diameter of the rotating shaft 23 is 0.8 mm, the length L1 (FIG. 2) of the rotating shaft 23 is 6 mm, the diameter of the supporting hole 14 is about 0.02 mm to 0.04 mm larger than 0.8 mm, and the depth d of the groove 13 is 0.06 mm. The closing plate 15 is formed of a stainless steel plate having a thickness of 0.5 mm.

For scribing a brittle object, the wheel cutter 1 having the above-described structure is moved in a scribing direction relative to the brittle object, with the tip holder 10 being loaded downward. Then, the cutter wheel tip 22 runs on the surface of the brittle object. The cutter wheel tip 22 is pressed on the surface of the brittle object by the force loading the entire tip holder 10 downward and moves in the scribing direction while rotating in contact with the surface.

When the cutter wheel tip 22 runs on the surface, impact is applied on the cutter wheel tip 22, and also on the rotating shaft 23 engaged with the cutter wheel tip 22. When the cutter wheel tip 22 is pressed on the surface, the rotating shaft 23 is elevated and pressed on an upper portion of the inner circumferential surface of the supporting hole 14.

The side wall 11 has the groove 13 in an upper area thereof facing the rotating shaft 23, the 13 projecting outward from the supporting hole 14 and having a V-shaped cross-section. Therefore, the rotating shaft 23 contacts borders Y1 and Y2 between the inner faces 13a and the supporting hole 14. Therefore, the reaction force from the entire inner circumferential surface of the supporting hole 14 is applied on the rotating shaft 23 at both the borders Y1 and Y2 in a divided state. As a result, the force applied on the rotating shaft 23 at each border Y1, Y2 is alleviated without being concentrated on any one specific portion.

Even though impact is applied on the tip holder 10 when the cutter wheel tip 22 runs on the brittle object, the impact applied on the rotating shaft 23 is alleviated.

Even when the impact is applied on the tip holder 10 in a direction represented by arrow Y3 or Y4 (FIG. 3), the impact is applied on the rotating shaft 23 at the borders Y1 and Y2 in a divided state. Therefore, the impact applied on the rotating shaft 23 is alleviated regardless of the direction in which the impact is applied on the tip holder 10.

Due to this alleviation of the impact applied on the rotating shaft 23, the durability of the rotating shaft 23 is significantly improved.

While the cutter wheel tip 22 moves while rotating in contact with the surface of the brittle object, a frictional force applied on the rotating shaft 23 from the inner circumferential surface of the supporting hole 14 is applied at the two borders Y1 and Y2. Thus, the rotation of the rotating shaft 23 is locked with certainty. The cutter wheel tip 22 rotates with respect to the stopped rotating shaft 23 with a certain resistance caused by friction, and moves while rotating in contact with the surface of the brittle object. As a result, the cutter wheel tip 22 stably scribes the surface of the brittle object and forms scribe lines of a uniform quality.

Since the rotation of the rotating shaft 23 can be locked with certainty, the rotating shaft 23 is prevented from being non-uniformly worn by the inner circumferential surface of the supporting hole 14.

The rotating force of the cutter wheel tip 22 for running on the surface of the brittle object also causes the rotating shaft 23 to slightly rotate. Therefore, the positional relationship of the outer circumferential surface of the rotating shaft 23 changes with respect to the inner circumferential surface of the cutter wheel tip 22 each time a different brittle object is scribed. Thus, the rotating shaft 23 and the cutter wheel tip 22, both formed of a hard metal or the like, are prevented or alleviated from becoming immovable with respect to each other due to the friction between the inner circumferential surface of the cutter wheel tip 22 and the outer circumferential surface of the rotating shaft 23.

Figure 4A:
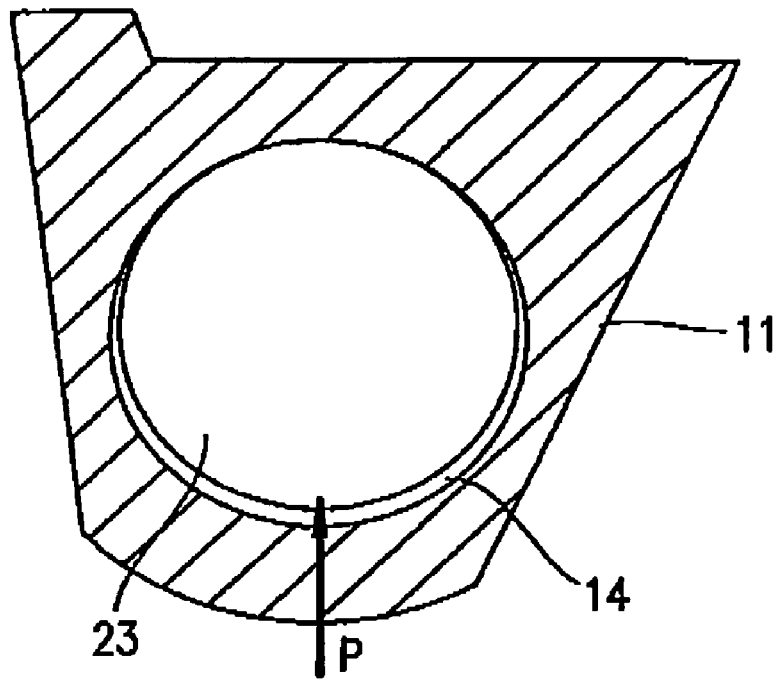
FIGS. 4A and 4B are cross-sectional views of a tip holder illustrating how a force applied on a rotating shaft is exerted against an inner circumferential surface of a supporting hole.

Hereinafter, it will be described in more detail that the groove 13 alleviates the force applied on the rotating shaft 23. FIG. 4A shows a state in which an upward force P is applied on the rotating shaft 23 with no groove being provided. More specifically, the rotating shaft 23 and the inner circumferential surface of the side wall 11 contact each other at one line, and the force P is applied on the rotating shaft 23 as a reaction force from the inner circumferential surface of the supporting hole 14.

Figure 4B:
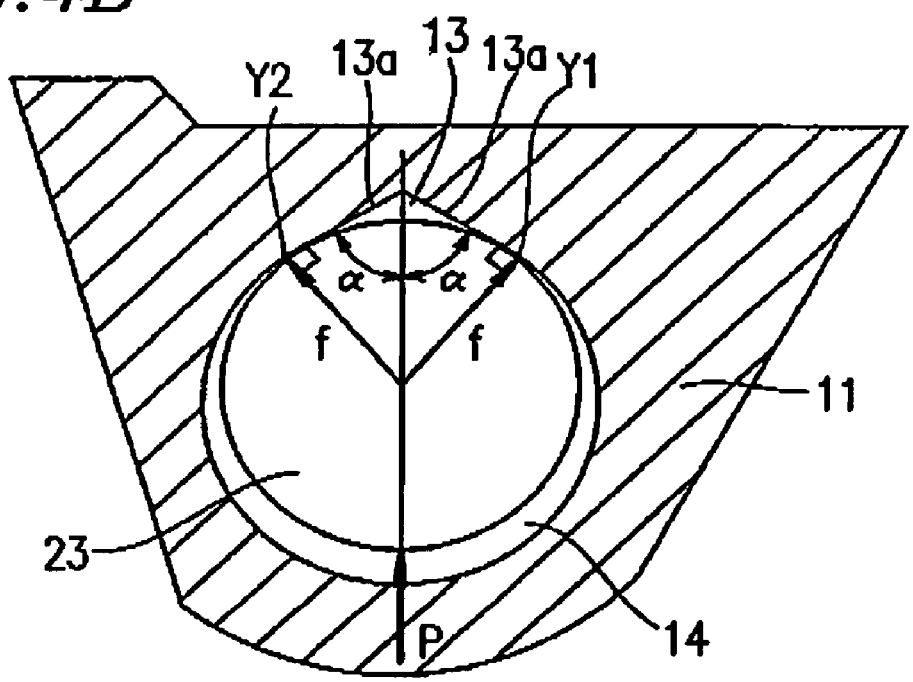

FIG. 4B shows a state where the groove 13 having a V-shaped cross-section projecting outward from the supporting hole 14 is formed. A bisector of the angle made by the inner faces 13a matches the vertical line passing through the center of the supporting hole 14. In this state, the upward force P applied on the rotating shaft 23 is divided into a force applied to the border Y1 and a force applied to the border Y2.

Where ½ of the angle made by the inner faces 13a is α as shown in FIG. 4B, a force f applied to each of the borders Y1 and Y2 is represented by expression (1).

$$f=(P \cdot \sin \alpha)/2 \tag{1}$$

Table 1 provided in FIG. 17 shows the ratio of the force f applied to each of the borders Y1 and Y2 with respect to the force P applied to the rotating shaft 23 in accordance with the angle α from expression (1).

It is appreciated from Table 1 that when a is 45 degrees, the ratio of the force 2f with respect to the force P is 0.354·P and thus the resistance of the rotating shaft 23 against impact is 1/0.354 times, i.e., about 2.8 times, the resistance when the groove 13 is not formed. This calculated value tends to be significantly close to the actually measured value although not exactly the same.

As described above, in the case where the side wall 11 does not have the groove 13, the rotating shaft 23 and the side wall 11 contact each other at one line. Therefore, the reaction force applied from the inner circumferential surface of the supporting hole 14 on the rotating shaft 23 is concentrated on that one line. In the case where the side wall 11 has the groove 13, the rotating shaft 23 and the side wall 11 contact each other at two lines. Therefore, the reaction force applied from the inner circumferential surface of the supporting hole 14 on the rotating shaft 23 is divided into two. As a result, the resistance of the rotating shaft 23 against impact is improved, thus eliminating the undesirable possibility of the rotating shaft 23 being broken.

When the wheel cutter 1 (FIG. 2) scribes a glass plate, the lowermost point of the cutter wheel tip 22 is usually set to be about 0.12 mm to about 0.20 mm below the surface of the glass plate in the state where the cutter wheel tip 22 is loaded downward. Thus, the cutter wheel tip 22 is pressure-contacted onto the surface. Where the cutter wheel tip 22 eats into the surface of the glass plate by less than 0.02 mm, the rotating shaft 23 is pressed upward vertically by about 0.1 mm to about 0.18 mm. Where the angle θ between the bisector of the angle made by two inner faces 13a (FIG. 3) and the vertical line passing through the center of the supporting hole 14 is in the range of 0 to 60 degrees, the distance by which the rotating shaft 23 is pressed up in the vertical direction is 0.05 mm to 0.09 mm when θ=60 degrees, which is the minimum possible value.

Figure 5:
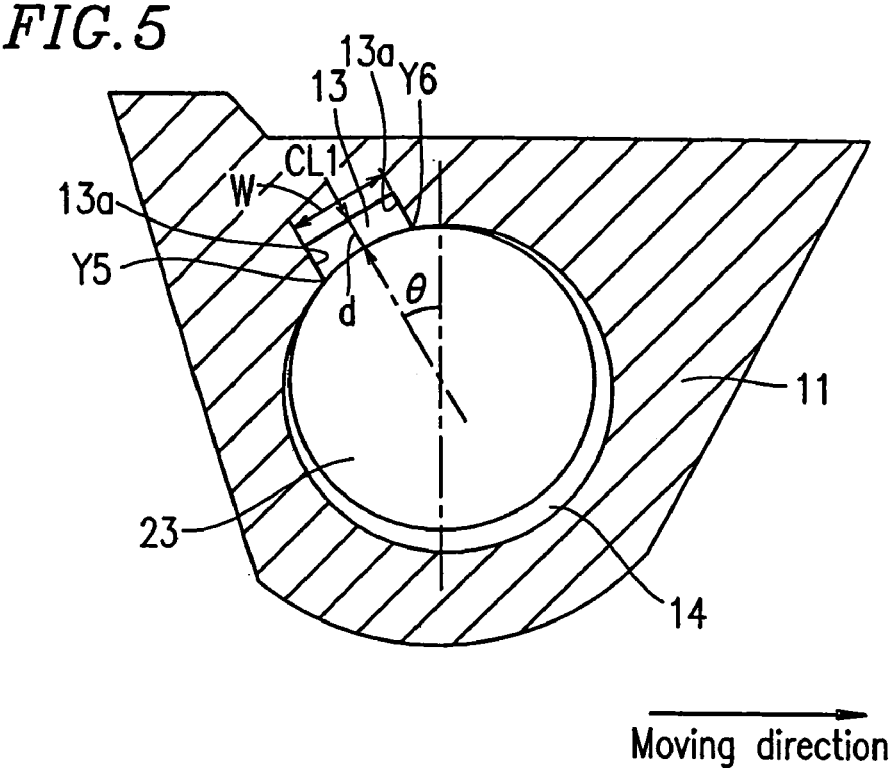
FIG. 5 is a partial cross-sectional view illustrating another example of a tip holder according to the present invention.

FIG. 5 shows a structure in which the groove 13 has a rectangular cross-section. The groove 13 is formed along the axial direction of the supporting hole 14. A bisector CL1 of the groove 13 which divides the width W of the groove 13 matches a line extending in a radial direction from the center of the supporting hole 14. The groove 13 is formed so that, for example, an angle θ made by the bisector CL1 and the vertical line passing through the center of the supporting hole 14 is 30 degrees. The groove 13 has a width W of, for example, 0.4 mm and a depth d of, for example, 0.1 mm.

In this case also, the rotating shaft 23 and the side wall 11 contact each other at borders Y5 and Y6 between the inner faces 13a and the supporting hole 14. Therefore, the rotation of the rotating shaft 23 is locked with certainty, and thus the cutter wheel tip 22 smoothly rotates without slipping with respect to the rotating shaft 23. The cutter wheel tip 22 moves while rotating in contact with the surface of a brittle object and stably forms a scribe line in the surface.

The impact applied on the rotating shaft 23 from the inner circumferential surface of the supporting hole 14 is alleviated, which realizes a long and stable use of the rotating shaft 23.

Figure 6:
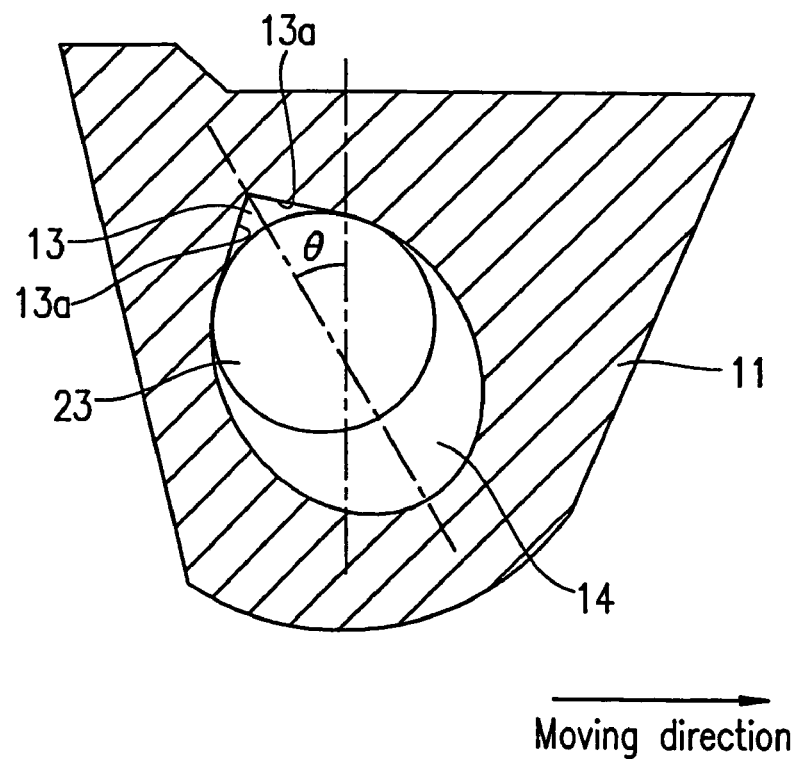
FIG. 6 is a partial cross-sectional view illustrating still another example of a tip holder according to the present invention.

FIG. 6 shows a structure in which the supporting hole 14 has an elliptical cross-section. The longer axis of the elliptical cross-section is at an angle of θ (θ=0 to 60 degrees) with respect to the vertical line passing through the center of the supporting hole 14. The groove 13 having a V-shaped cross-section is formed above and continuous from the supporting hole 14. A bisector of an angle made by the inner faces 13a matches the longer axis of the elliptical cross-section.

In this structure, the rotating shaft 23 can move vertically by a larger distance than for the circular cross-sectioned supporting hole 14. Therefore, the cutter wheel tip 22 of the tip holder 10 (FIG. 1) may project downward from the bottom surface of the side wall 11 by as much as 1 mm or more. Still, the lowermost point of the cutter wheel tip 22 can be set to be about 0.2 mm to about 0.9 mm below the surface of the brittle object.

The supporting hole 14 may have a polygonal cross-section instead of a circular or elliptical cross-section. In the case where the supporting hole 14 has a polygonal cross-section, the groove 13 is defined by one corner of the polygon. Two adjacent sides of the polygon interposing the corner defining the groove 13 act as inner faces 13a. The rotating shaft 23 is pressure-contacted on these two sides.

Figure 7:
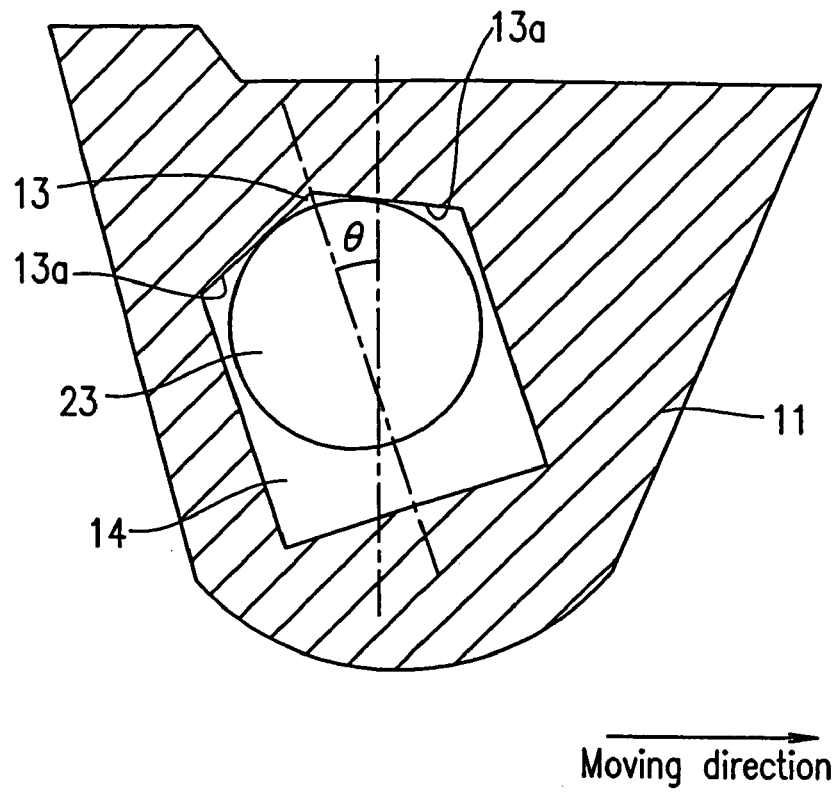
FIG. 7 is a partial cross-sectional view illustrating still another example of a tip holder according to the present invention.

FIG. 7 shows a structure in which the supporting hole 14 has a pentagonal cross-section. The groove 13 having a V-shaped cross-section is defined by one of the five corners. In this case also, a bisector of the corner defining the groove 13 is at an angle of θ (θ=0 to 60 degrees) with respect to the vertical line passing through the supporting hole 14.

Figure 8:
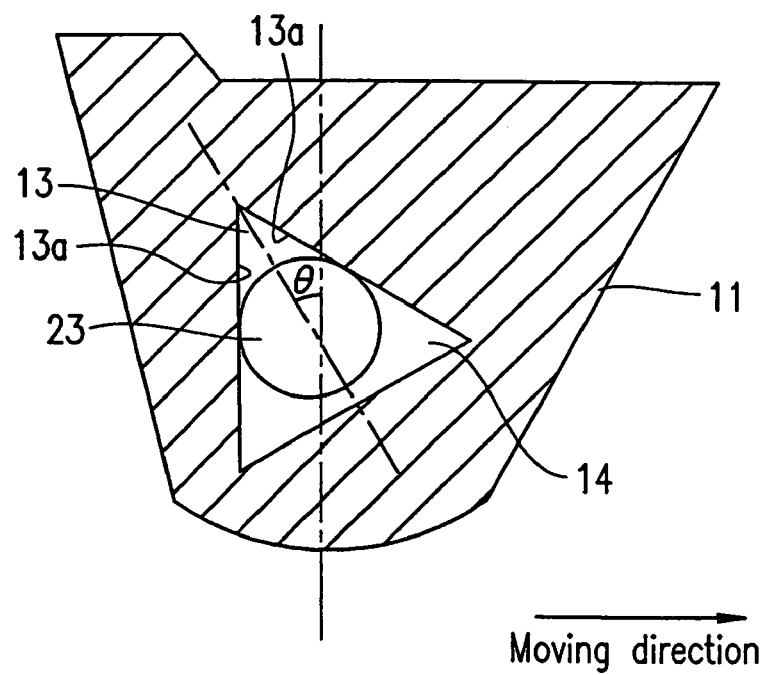
FIG. 8 is a partial cross-sectional view illustrating still another example of a tip holder according to the present invention.

FIG. 8 shows a structure in which the supporting hole 14 has a triangular cross-section. The groove 13 having a V-shaped cross-section is defined by one of the three corners. In this case also, a bisector of the corner defining the groove 13 is at an angle of θ (θ=0 to 60 degrees) with respect to the vertical line passing through the supporting hole 14.

Figure 9:
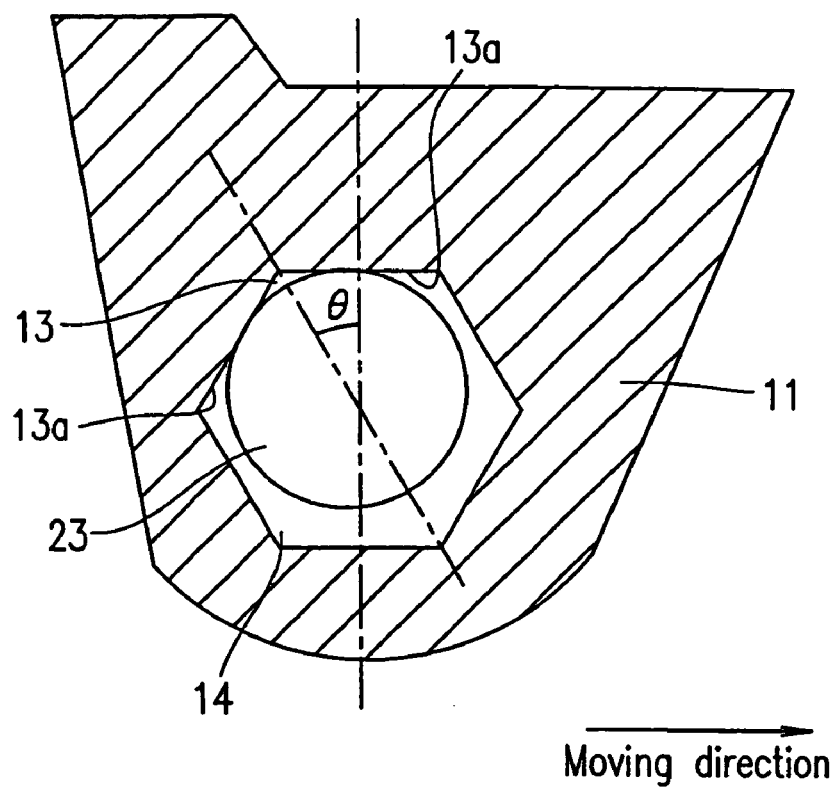
FIG. 9 is a partial cross-sectional view illustrating still another example of a tip holder according to the present invention.

FIG. 9 shows a structure in which the supporting hole 14 has a hexagonal cross-section. The groove 13 having a V-shaped cross-section is defined by one of the six corners. In this case also, a bisector of the corner defining the groove 13 is at an angle of θ (θ=0 to 60 degrees) with respect to the vertical line passing through the supporting hole 14.

The supporting hole 14, when having a polygonal cross-section, preferably has a triangular, a quadrangular, a pentagonal, a hexagonal, a heptagonal or an octagonal cross-section. When the number of corners exceeds eight, the pressure-contacting force of the inner faces 13a defining the groove 13 applied on the rotating shaft 23 may be too small so as to lock the rotation of the rotating shaft 23.

Figure 10:
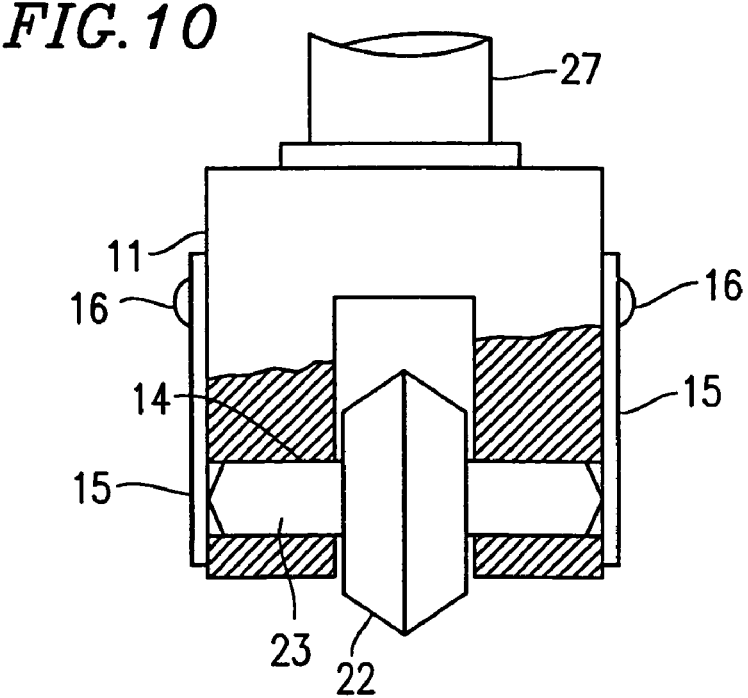
FIG. 10 is a partially cut front view illustrating still another example of a tip holder according to the present invention.

FIG. 10 is a partially cut cross-sectional view illustrating another exemplary structure of a tip holder 10 according to the present invention. In the tip holder shown in FIG. 10, the two side walls 11 have an equal width. The two supporting holes 14 pass through the respective side walls 11 up to the outer surfaces of the side walls 11. The rotating shaft 23 projects from the cutter wheel tip 22 in two opposite directions by an equal length.

A closing plate 15 for closing each opening is provided on each outer surface of each side wall 11. The closing plate 15 is attached to the side wall 11 with a screw 16 provided on a top portion of the closing plate 15. A bottom portion of the closing plate 15 closes the opening, and contacts the tip of the rotating shaft 23 so as to prevent the rotating shaft 23 from coming out of the supporting hole 14.

The tip holder shown in FIG. 10 is identical with that of the tip holder 10 shown in FIG. 2 except for the above-described points. Since the supporting holes 14 in the side walls 11 support side portions of the rotating shaft 23 of an equal length, the rotating shaft 23 is stably supported. Thus, the cutter wheel tip 22 engaged with the rotating shaft 23 stably rotates.

FIG. 11 is a partially cut cross-sectional view illustrating still another exemplary structure of a tip holder 10 according to the present invention. In the tip holder shown in FIG. 11, the two side walls 11 have an equal thickness. One of the side walls 11 has a pin hole f19 in communication with the supporting hole 14. The structure of the tip holder shown in FIG. 11 is identical with that of the tip holder 10 shown in FIG. 2 except for the above-described points.

As shown in FIG. 11, one of the supporting holes 14 which is in communication with the pin hole 19 is shorter than the other. Accordingly, the cutter wheel tip 22 is engaged with the rotating shaft 23 at a point closer to one of the ends thereof, so that one of the side portions of the rotating shaft 23 is supported by the shorter supporting hole 14.

In this structure, when the side portion of the rotating shaft 23 which is supported by the shorter supporting hole 14 is worn, the two side portions of the rotating shaft 23 are exchanged with each other, and the cutter wheel tip 22 is engaged with the rotating shaft 23 at a different position. Then, the worn portion of the rotating shaft 23 is located in the longer supporting hole 14. Since the cutter wheel tip 22 is now engaged with the rotating shaft 23 at the different position, a part which is not worn is also located in the longer supporting hole 14. Therefore, the rotating shaft 23 can be used for a longer time.

FIG. 12 is a partially cut cross-sectional view illustrating still another exemplary structure of a tip holder 10 according to the present invention. In the tip holder 10 shown in FIG. 12, one of the two side walls 11 is thicker than the other. The structure of the tip holder 10 shown in FIG. 12 is identical with that of the tip holder 10 shown in FIG. 10 except for the above-described points. The tip holder 10 shown in FIG. 12 can be used for a longer time for the same reason as that described above regarding the tip holder shown in FIG. 11.

Figure 13A:
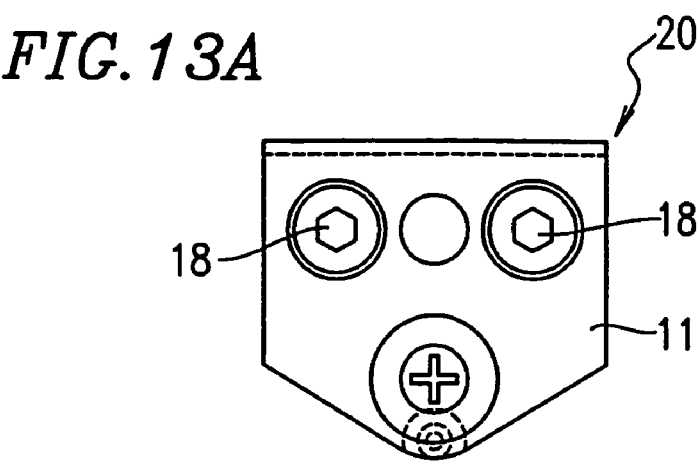
FIG. 13A is a partially cut side view illustrating still another example of a tip holder according to the present invention.
Figure 13B:
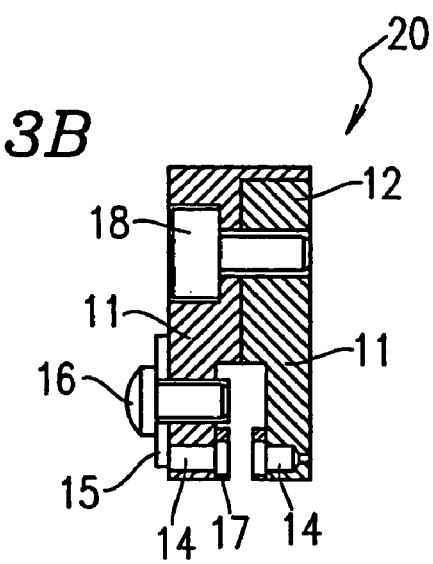
FIG. 13B is a cross-sectional view of the tip holder shown in FIG. 13A.
Figure 13C:
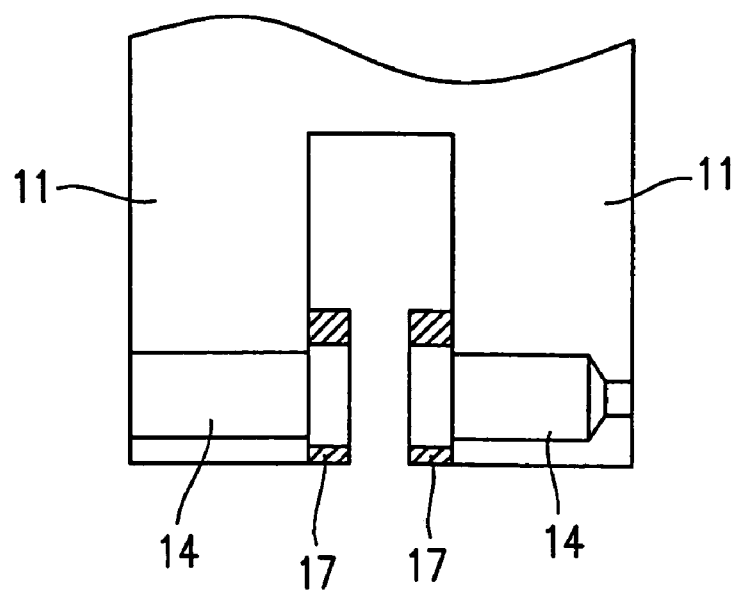
FIG. 13C is an enlarged view of a part of the tip holder shown in FIG. 13B.

FIG. 13A is a side view of a tip holder 20 according to another example of the present invention. FIG. 13B is a cross-sectional view thereof, and FIG. 13C is an enlarged view of a part thereof. The tip holder 20 has a similar structure to that of the tip holder 10 shown in FIG. 2, except that a ring-shaped tip receiver 17 is provided on an inner portion of each side wall 11 facing the cutter wheel tip 22. The ring-shaped tip receiver 17 is provided so as to surround the respective supporting hole 14. Each tip receiver 17 is formed of a hard metal. The rotating shaft 23 is inserted through the tip receiver 17 and then into the supporting hole 14. The tip receivers 17 slidably contact respective side surfaces of the cutter wheel tip 22, which is freely rotatable with respect to the rotating shaft 23. Thus, the tip receivers 17 prevents the cutter wheel tip 22 from moving along the axial direction of the rotation shaft 23.

In this structure, the tip receivers 17 protect the side surfaces of the cutter wheel tip 22 from directly contacting the inner surfaces of the side walls 11. Thus, the inner surfaces of the side walls 11 are prevented from being worn. The tip receivers 17 also stabilize the rotation of the cutter wheel tip 22, which, in turn, scribes the surface of a brittle object more stably.

Each tip receiver 17 is provided in, for example, the following manner. A hard metal cylinder, having an outer diameter which is larger than the diameter of the supporting hole 14 and an inner diameter which is also slightly larger than the diameter of the supporting hole 14, is cut into a piece having a thickness of about 0.5 mm. This piece is used as a tip receiver 17. The tip receiver 17 is aligned around the supporting hole 14 such that the center of the supporting hole 14 matches the center of the inner hole of the tip receiver 17, and then is silver-soldered around the supporting hole 14. A face of the tip receiver 17 which is to contact the cutter wheel tip 22 is polished by a diamond grinder or the like.

Figure 14A:
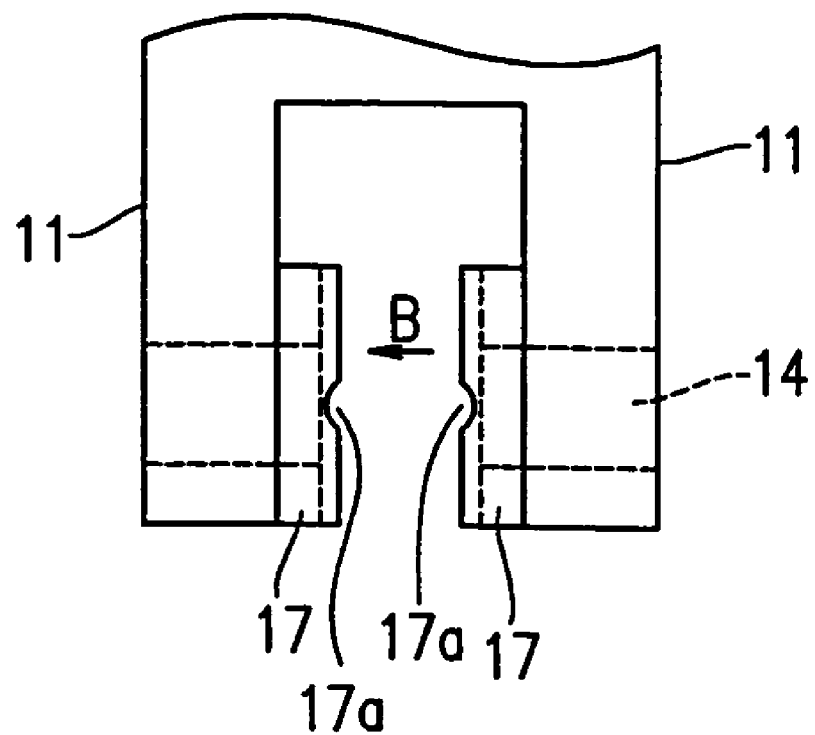
FIG. 14A is an enlarged front view illustrating still another example of a tip holder according to the present invention.
Figure 14B:
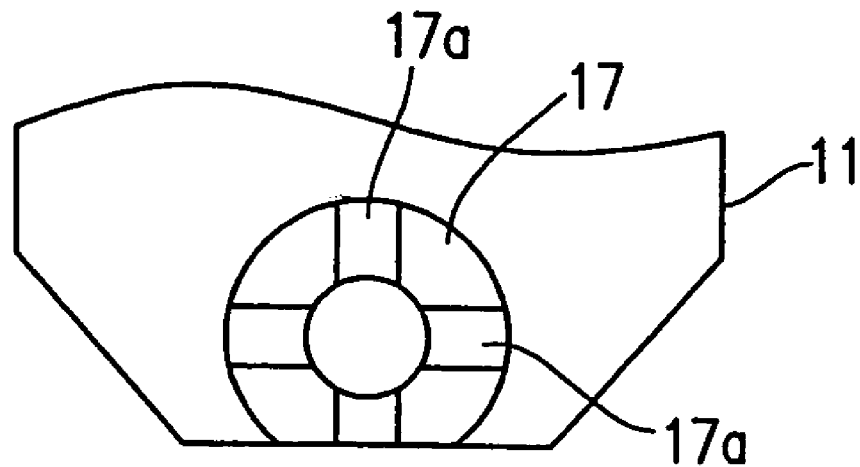
FIG. 14B is a side view of the tip holder shown in FIG. 14A seen in the direction of arrow B in FIG. 14A.

FIG. 14A is a side view illustrating another exemplary structure of a tip holder according to the present invention. FIG. 14B is a view of a portion of the tip receiver 17 seen in the direction of arrow B in FIG. 14A. As shown in FIGS. 14A and 14B, an inner face of each tip receiver 17 has grooves 17a extending from the central hole thereof in a horizontal direction and a vertical direction. Due to this structure, cullet, dust or the like generated while the brittle object is scribed is scattered through the grooves 17a. Therefore, the cullet, dust or the like is prevented from concentrating on the edge of the cutter wheel tip 22. As a result, the brittle object can be stably scribed, and the edge of the cutter wheel tip 22 can be used for a longer time. The grooves 17a may be extended in any radial direction from the central hole of the tip receiver 17, instead of the horizontal or vertical direction. The grooves 17a may be provided in a lattice surrounding the central hole of the tip receiver 17.

The tip holder 20 shown in FIGS. 13A, 13B and 13C is produced by connecting upper portions of two side walls together with two screws 18 so as to form the top portion 12. The side walls 11 and the top portion 12 may be integrally formed of a material having an excellent abrasion resistance such as, for example, a hard metal, sintered diamond, diamond-dispersed hard metal, and CBN (cubic boron nitride). When the side walls 11 and the top portion 12 are integrally formed, the tip holder is alleviated from deformation caused by impact due to, for example, scribing. Thus, the tip holder can stably hold the cutter wheel tip for a longer time, and therefore allows the cutter wheel tip 22 to scribe a brittle object stably for a longer time.

Figure 15A:
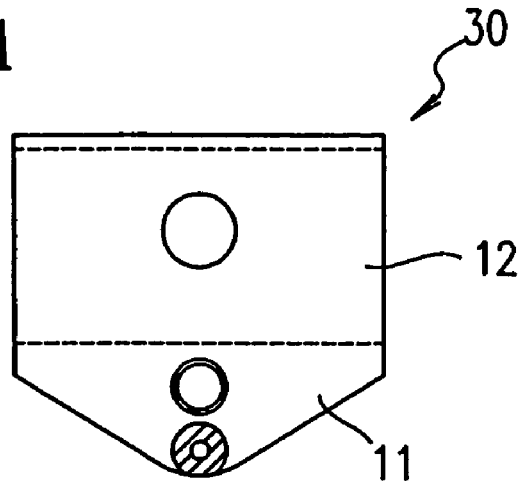
FIG. 15A is a partially cut side view illustrating still another example of a tip holder according to the present invention.
Figure 15B:
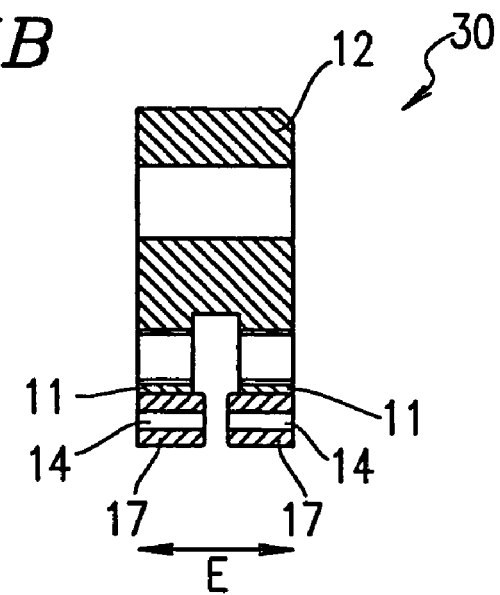
FIG. 15B is a cross-sectional view of the tip holder shown in FIG. 15A.
Figure 15C:
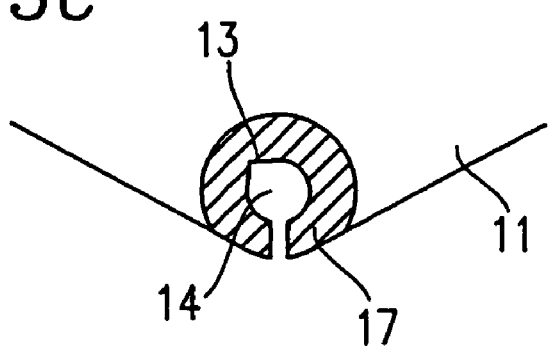
FIG. 15C is an enlarged view of a part of the tip holder shown in FIG. 15B.
Figure 16:
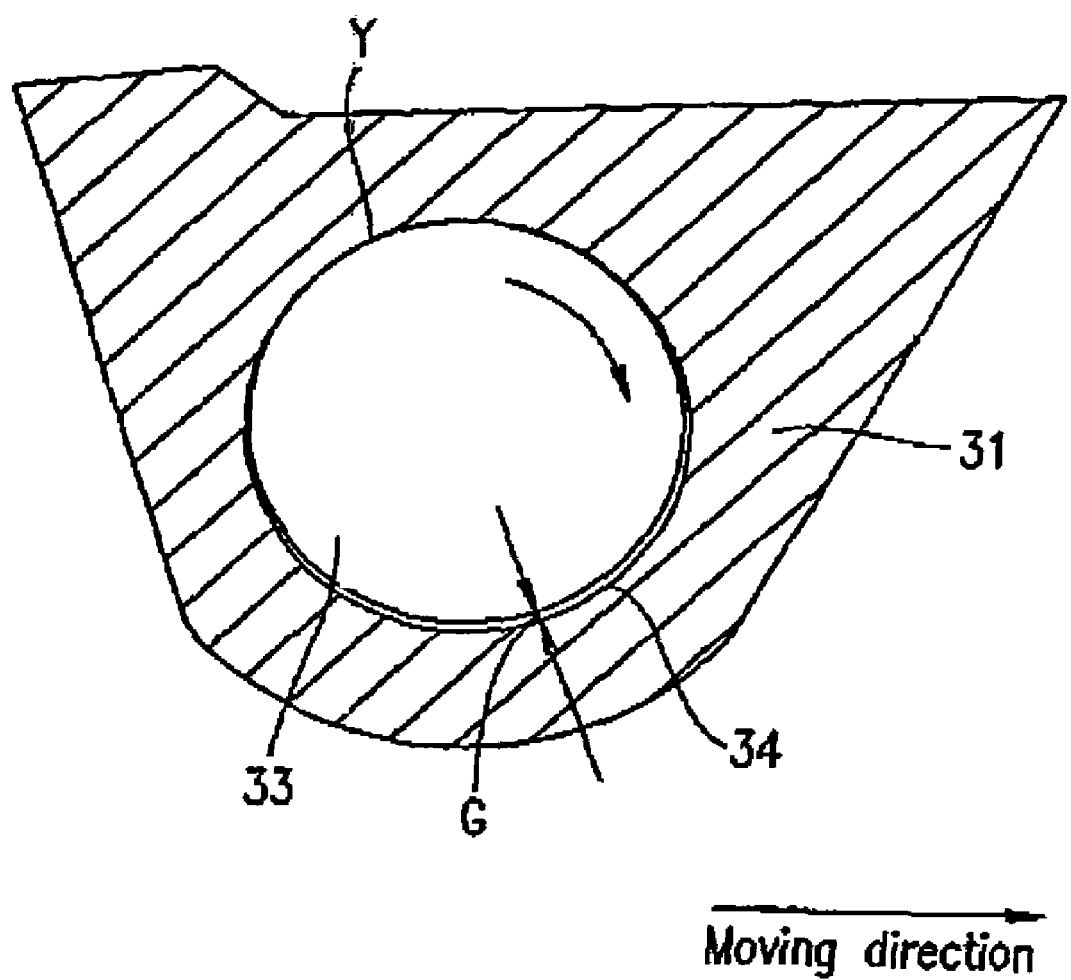
FIG. 16 is an enlarged cross-sectional view of a part of a conventional tip holder.

FIG. 15A is a side view of a tip holder 30 according to still another example of the present invention. FIG. 15B is a dross-sectional view thereof, and FIG. 15C is an enlarged view of a part thereof. The side walls 11 and the top portion 12 are integrally formed of a metal material such as, for example, SK. Each tip receiver 17 is formed of a material having an excellent abrasion resistance such as, for example, a hard metal, sintered diamond, diamond-dispersed hard metal, and CBN. Each side wall 11 has a through-hole in a bottom portion thereof, and the tip receiver 17 is integrally provided in the through-hole. The central hole of the tip receiver 17 acts as the supporting hole 14. The side walls 11 each have a groove 13 projecting outward from the supporting hole 14 along the axial direction thereof. The tip receiver 17 projects inward from the inner face of the side wall 11 by an appropriate length, and the projecting end of the tip receiver 17 contacts the respective side surface of the cutter wheel tip 22.

The tip holder 30 having such a structure is produced, for example, as follows. A metal block formed of hard metal, an SK material, or the like having a prescribed shape is prepared. A The block does not have a gap in which the cutter wheel tip 22 is to be located. A through-hole in which the tip receivers 17 are to be located is formed in a thickness direction E in a bottom portion of the block. A cylinder to be used as the tip receivers 17 is inserted into the through-hole and silver-soldered on an inner circumferential surface of the block. A through-hole to act as the supporting holes 14 is formed through the center hole of the cylinder by wire discharge. The groove 13 is formed so as to project outward from the through-hole in the axial direction thereof. A gap in which the cutter wheel tip 22 is to be located is formed, thereby forming the side walls 11. Thus, the tip holder 30 shown in FIGS. 15A, 15B and 15C is produced.

The supporting holes 14 and the gap in which the cutter wheel tip 22 is located may be produced by grinding or by any other appropriate method.

The tip holder 30 has the supporting hole 14 through the axial center of the tip receiver 17. The tip receiver 17 is opened at the bottom along the axial direction of the tip receiver 17.

Except for the points described above, the tip holder 30 has substantially the same structure as that of the tip holder 10 shown in FIG. 2.

The tip holder 30 has an improved size precision and is more greatly alleviated from deformation caused by impact or the like, as compared with the tip holder 20 shown in FIGS. 13A, 13B and 13C which is produced by assembling the side walls 11 and the top portion 12 using screws. Therefore, the tip holder 30 can hold the cutter wheel tip 22 more stably for a longer time and therefore allows the cutter wheel tip 22 to scribe a brittle object stably for a longer time.

The supporting holes 14 are formed in the axial center of the tip receivers 17, and the side portions of the rotating shaft 23 are respectively supported by the entire portions of the tip receivers 17 projecting from the side walls 11. As compared with the tip holder 20 shown in FIGS. 13A, 13B and 13C in which the inner diameter of the tip receivers 17 is larger than the diameter of the supporting holes 14 and thus the rotating shaft 23 is supported by the supporting holes 14, the tip holder 30 supports the rotating shaft 23 by a greater length and thus significantly improves the impact resistance and destruction resistance.

It is preferable to form the grooves 17a as shown in FIGS. 14A and 14B on the inner face of each tip receiver 17 in, for example, a vertical direction and a horizontal direction. Cullet, dust or the like generated while the brittle object is scribed is scattered through the grooves 17a. Therefore, the cullet, dust or the like is prevented from entering between the cutter wheel tip 22 and the tip receivers 17a to cause the cutter wheel tip 22 and the tip receivers 17a to be immovable with respect to each other. Thus, the tip holder can scribe a brittle object more stably and extend the life of the edge of the cutter wheel tip 22.

The inner face of the tip receiver 17 which is to contact the cutter wheel tip 22 may be treated with DLC (diamond-like coating) in order to improve resistance against wear or slipperiness. As such, the cutter wheel tip 22 rotates more smoothly, resulting in formation of more stable scribe lines and longer life of the cutter wheel tip 22.

As described above, the present invention provides a tip holder for realizing long and stable use of a rotating shaft engaged with a cutter wheel tip and for allowing the cutter wheel tip to stably scribe a surface of a brittle object.

The invention claimed is:

1. A tip holder for holding a rotating shaft which is inserted through an axial center of a cutter wheel tip for scribing a brittle material, the tip holder comprising:
   a pair of side walls having respective substantially cylindrical supporting receptacles into which tip receivers are respectively inserted; and
   a top portion connecting upper portions of the pair of side walls,
   wherein the pair of side walls and the top portion are integrally formed,
   the tip receivers prevent the cutter wheel tip from abrading the side walls due to contact with the side walls,
   each of the tip receivers comprises a central through-hole into which side portions of the rotating shaft are respectively inserted, and
   each central through-hole is provided with a groove located at an upper portion of the central through-hole or directly above a central axis of the central through-hole, the groove having an inner surface that is continuous with an inner circumferential surface of the central through-hole, such that a cross-sectional perimeter of the groove extends continuously from a cross-sectional perimeter of the central through-hole, and the groove being provided along substantially the entire length of the side portions of the rotating shaft.

2. A tip holder according to claim 1, wherein the groove is provided along and on a face of the tip receiver facing the cutter wheel tip, so as to extend in a radial direction from the central through-hole formed in the tip receiver to an edge of said face.

3. A tip holder according to claim 1, wherein each supporting receptacle is formed by wire discharge.

4. A tip holder according to claim 1, wherein the tip receiver is formed of a material from a group consisting of a hard metal, sintered diamond, diamond-dispersed hard metal, and CBN.

5. A tip holder according to claim 1, wherein the groove has a V-shaped cross-section and projects outward from the central through-hole.

6. A tip holder according to claim 1, when the groove is located at said upper portion of the central through-hole, the groove is provided on a side opposite to a direction in which the cutter wheel tip is moved for scribing the brittle material.

7. A tip holder for holding a rotating shaft which is inserted through an axial center of a cutter wheel tip for scribing a brittle material, the tip holder comprising:
   a pair of side walls having respective supporting receptacles into which tip receivers are respectively inserted; and
   a top portion connecting upper portions of the pair of side walls, wherein the pair of side walls and the top portion are integrally formed, the tip receivers prevent the cutter wheel tip from abrading the side walls due to contact with the side walls, each of the tip receivers comprises a central through-hole into which side portions of the rotating shaft are respectively inserted and rotatably supported, and each central through-hole is provided with a groove located at an upper portion of the central through-hole or directly above a central axis of the central through-hole, the groove having an inner surface that is continuous with an inner circumferential surface of the central through-hole, such that a cross-sectional perimeter of the groove extends continuously from a cross-sectional perimeter of the central through-hole, and said groove being provided along substantially the entire length of the side portions of the rotating shaft.

8. A tip holder according to claim 7, wherein the groove is provided on a face of the tip receiver facing the cutter wheel tip, so as to extend in a radial direction from the central through-hole formed in the tip receiver to an edge of said face.

9. A tip holder according to claim 7, wherein each supporting receptacle is formed by wire discharge.

10. A tip holder according to claim 7, wherein the tip receiver is formed of a material from a group consisting of a hard metal, sintered diamond, diamond-dispersed hard metal, and CBN.

11. A tip holder according to claim 7, wherein the groove has a V-shaped cross-section and projects outward from the central through-hole.

12. A tip holder according to claim 7, wherein when the groove is located at said upper portion of the central through-hole, the groove is provided on a side opposite to a direction in which the cutter wheel tip is moved for scribing the brittle material.

* * * * *